US010750656B2

(12) United States Patent
Stanhope et al.

(10) Patent No.: US 10,750,656 B2
(45) Date of Patent: Aug. 25, 2020

(54) SYSTEM AND METHOD FOR MONITORING THE FRAME LEVELNESS OF AN AGRICULTURAL IMPLEMENT

(71) Applicant: CNH Industrial America LLC, New Holland, PA (US)

(72) Inventors: Trevor Stanhope, Darien, IL (US); Jason Fox, Chicago, IL (US); Luca Ferrari, Modena (IT)

(73) Assignee: CNH Industrial America LLC, New Holland, PA (US)

( * ) Notice: Subject to any disclaimer, the term of this patent is extended or adjusted under 35 U.S.C. 154(b) by 64 days.

(21) Appl. No.: 16/022,887

(22) Filed: Jun. 29, 2018

(65) Prior Publication Data
US 2020/0000005 A1  Jan. 2, 2020

(51) Int. Cl.
*A01B 79/00* (2006.01)
*A01B 15/14* (2006.01)
*G01S 13/89* (2006.01)
*A01B 63/00* (2006.01)
*G01B 11/22* (2006.01)
*A01B 35/32* (2006.01)

(52) U.S. Cl.
CPC ............ *A01B 79/005* (2013.01); *A01B 15/14* (2013.01); *A01B 35/32* (2013.01); *A01B 63/002* (2013.01); *G01B 11/22* (2013.01); *G01S 13/89* (2013.01)

(58) Field of Classification Search
CPC ..... A01B 79/005; A01B 63/002; A01B 35/32; A01B 15/14; G01B 11/22; G01S 13/89
USPC .......................................................... 701/50
See application file for complete search history.

(56) References Cited

U.S. PATENT DOCUMENTS

| | | | |
|---|---|---|---|
| 6,095,254 A | 8/2000 | Homburg | |
| 6,791,488 B2 | 9/2004 | Diekhans et al. | |
| 9,733,355 B2 | 8/2017 | Chan et al. | |
| 2016/0078570 A1 | 3/2016 | Ethington et al. | |
| 2016/0116632 A1* | 4/2016 | Stoller | A01B 79/005 356/72 |
| 2018/0114305 A1* | 4/2018 | Strnad | A01B 79/005 |

FOREIGN PATENT DOCUMENTS

| | | |
|---|---|---|
| CN | 106716285 A | 5/2017 |
| WO | WO2014131515 A2 | 9/2014 |

* cited by examiner

*Primary Examiner* — Maceeh Anwari
(74) *Attorney, Agent, or Firm* — Rebecca L. Henkel; Rickard K. DeMille

(57) ABSTRACT

In one aspect, a system for monitoring the frame levelness of an agricultural implement include first and second sensors configured to capture data indicative of a position differential defined between a soil surface and a portion of an a first and second ground engaging tool positioned below the soil surface, respectively. The captured data may be associated at least partially with the receipt of sensor signals reflected off of the portion of the associated ground engaging tool positioned below the soil surface. The system may also include a controller configured to determine penetration depths of the first and second ground engaging tools based on the captured data received from the first and second sensors, respectively. The controller may also be configured to monitor the frame levelness based on a penetration depth differential defined between the first and second penetration depths.

20 Claims, 7 Drawing Sheets

SYSTEM AND METHOD FOR MONITORING THE FRAME LEVELNESS OF AN AGRICULTURAL IMPLEMENT

FIELD

The present disclosure generally relates to agricultural implements and, more particularly, to systems and methods for monitoring the frame levelness of an agricultural implement based on penetration depths of ground engaging tools mounted on the implement.

BACKGROUND

It is well known that, to attain the best agricultural performance from a field, a farmer must cultivate the soil, typically through a tillage operation. Modern farmers perform tillage operations by pulling a tillage implement behind an agricultural work vehicle, such as a tractor. As such, the tillage implement typically includes a plurality of wheels to facilitate towing of the implement. The wheels may be mounted at various locations on a frame of the implement to support the implement relative to the ground. Additionally, tillage implements generally include a plurality of ground engaging tools coupled to the frame that are configured to penetrate the soil to a particular depth. The ground engaging tools may be spaced apart from each other on the frame so as to provide uniform tilling to the swath of field over which the implement is towed.

When performing a tillage operation, it is desirable to create a level and uniform layer of tilled soil across the field to form a proper seedbed for subsequent planting operations. However, variations in one or more operating parameters of the implement may cause the implement frame to pitch, roll, or otherwise be oriented at an angle relative to the ground. In such instances, the ground engaging tools mounted on the frame may penetrate the ground to differing depths, thereby resulting in an uneven seedbed. Unfortunately, current tillage systems fail to account for such variations in the implement's operating parameters when performing a tillage operation.

Accordingly, improved systems and methods for monitoring frame levelness of an agricultural implement would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for monitoring the frame levelness of an agricultural implement. The system may include a frame extending in a longitudinal direction between a forward end and an aft end and in a lateral direction between a first side and a second side. The system may also include first and second ground engaging tools coupled to the frame, with the first and second ground engaging tools being spaced apart from each other in at least one of the longitudinal direction or the lateral direction. The system may further include a first sensor configured to capture data indicative of a first position differential defined between a soil surface and a portion of the first ground engaging tool positioned below the soil surface. The captured data may be associated at least partially with the receipt of sensor signals reflected off of the portion of the first ground engaging tool positioned below the soil surface. Additionally, the system may include a second sensor configured to capture data indicative of a second position differential defined between the soil surface and a portion of the second ground engaging tool positioned below the soil surface. The captured data may be associated at least partially with the receipt of sensor signals reflected off of the portion of the second ground engaging tool positioned below the soil surface. Furthermore, the system may include a controller communicatively coupled to the first and second sensors. The controller may be configured to determine a first penetration depth of the first ground engaging tool based on the captured data received from the first sensor. The controller may also be configured to determine a second penetration depth of the second ground engaging tool based on the captured data received from the second sensor. Additionally, the controller may be configured to monitor a frame levelness associated with the frame based on a penetration depth differential defined between the first and second penetration depths.

In another aspect, the present subject matter is directed to a system for monitoring the penetration depths of tools associated with an agricultural implement. The system may include a frame and a ground engaging tool coupled to the frame. The system may also include a sensor configured to capture data indicative of a position differential defined between a soil surface of the ground and a portion of the ground engaging tool positioned below the soil surface. The captured data may be associated at least partially with the receipt of sensor signals reflected off of both the soil surface and the portion of the second ground engaging tool positioned below the soil surface. Furthermore, the system may include a controller communicatively coupled to the sensor. The controller may be configured to determine a first distance between the frame and the soil surface based on the captured data received from the sensor. The controller may further be configured to determine a second distance between the frame and a tip of the ground engaging tool positioned below the soil surface based on the captured data received from the sensor. Additionally, the controller may be configured to determine a penetration depth of the ground engaging tool based on a differential defined between the first and second distances.

In a further aspect, the present subject matter is directed to a method for monitoring the frame levelness of an agricultural implement. The implement may include a frame extending in a longitudinal between a forward end and an aft end and in a lateral direction between a first side and a second side. The implement may further include first and second ground engaging tools coupled to the frame, with the first and second ground engaging tools being spaced apart from each other in at least one of the longitudinal direction or the lateral direction. The method may include determining, with a computing device, a first penetration depth of the first ground engaging tool based on data received from a first sensor. The first sensor may be configured to capture data indicative of a first position differential defined between a soil surface and a portion of the first ground engaging tool positioned below the soil surface, with the captured data being associated at least partially with the receipt of sensor signals reflected off of the portion of the first ground engaging tool positioned below the soil surface. The method may also include determining, with the computing device, a second penetration depth of the second ground engaging tool based on data received from a second sensor. The second sensor may be configured to capture data indicative of a second position differential defined between the soil surface and a portion of the second ground engaging tool positioned below the soil surface, with the captured data being associated at least partially with the receipt of sensor signals reflected off of the portion of the second ground engaging tool positioned below the soil surface. Moreover, the method may include monitoring, with the computing device, a frame levelness associated with the frame based on a penetration depth differential defined between the first and second penetration depths. Additionally, the method may include initiating, with the computing device, a control action associated with adjusting the frame levelness based on a magnitude of the monitored parameter differential.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
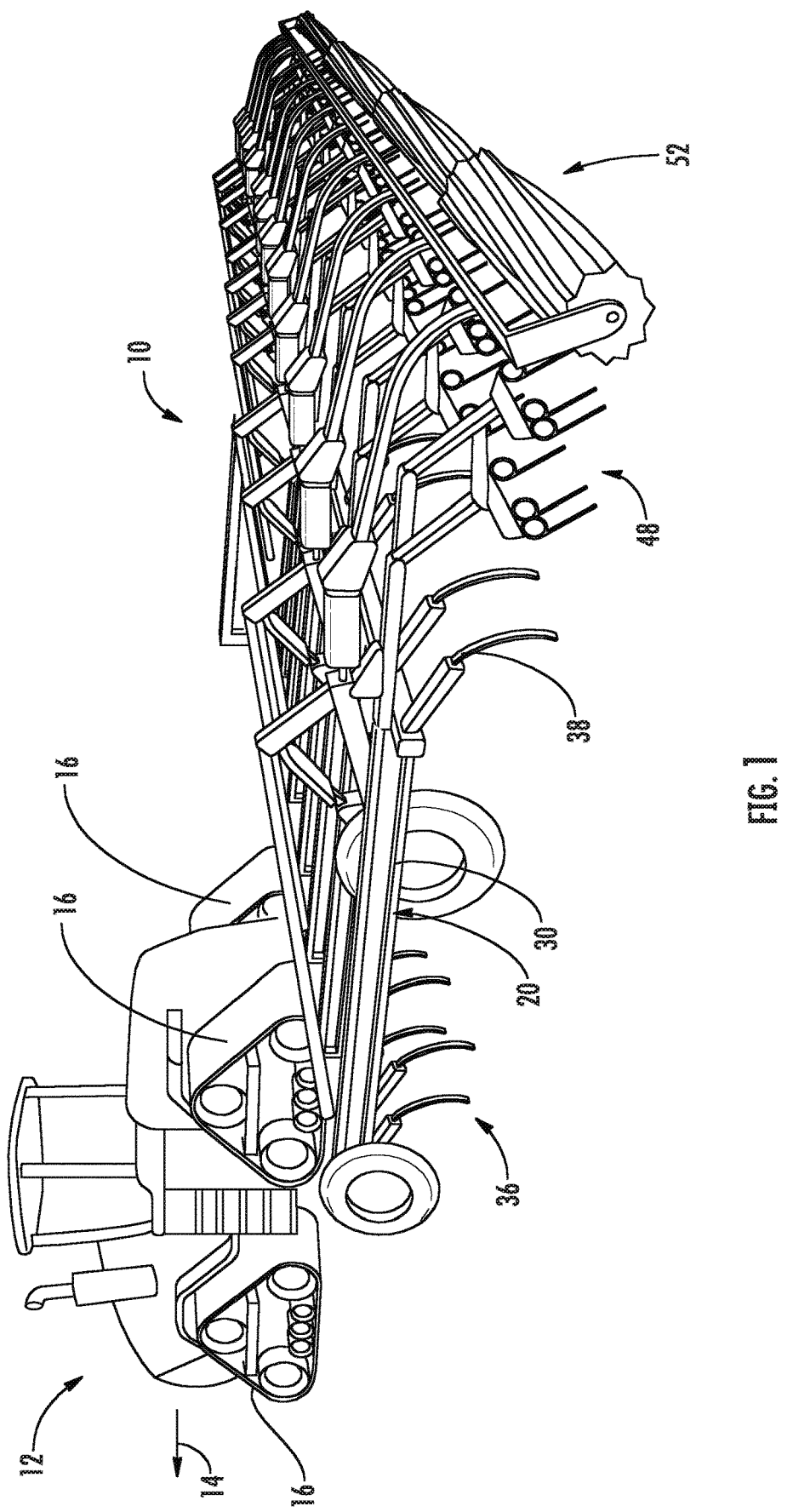
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring the frame levelness of an agricultural implement based on monitored parameters associated with two or more ground engaging tools of the implement. Specifically, in several embodiments, a controller of the disclosed system may be configured to determine the penetration depths of first and second ground engaging tools of the implement based on an associated position differential defined between the soil surface and a portion of the corresponding ground engaging tool positioned below the soil surface. For example, in one embodiment, the controller may be configured to determine the position differentials based on sensor data associated at least partially with the receipt of sensor signals reflected off of the portions of the ground engaging tools positioned below the soil surface. Thereafter, the controller may be configured to determine a penetration depth differential defined between the penetration depths of the first and second ground engaging tools. Based on the relative positioning of the first and second ground engaging tools on the implement's frame, the penetration depth differential may, in turn, be indicative of pitching of the frame in a longitudinal direction and/or rolling of the frame in a lateral direction. For example, if the penetration depth of the first ground engaging tool is greater than the penetration depth of the first ground engaging tool, the controller may determine that the implement frame has pitched and/or rolled relative to a desired orientation or levelness of the frame relative to the ground. Thus, when it is determined that the penetration depth differential existing between the first and second ground engaging tools exceeds a maximum penetration depth differential threshold set for the implement or falls below a minimum penetration depth differential threshold set for the implement, the controller may be configured to initiate a control action associated with adjusting the amount of pitch and/or the roll of the frame, thereby allowing the frame orientation or levelness relative to the ground to be adjusted. For instance, the controller may be configured to adjust the position of one component of the implement (e.g., a wheel of the implement) relative to another component of the implement (e.g., the frame) to reduce the amount of pitch and/or roll of the frame in an attempt to correct the frame orientation or levelness.

Figure 2:
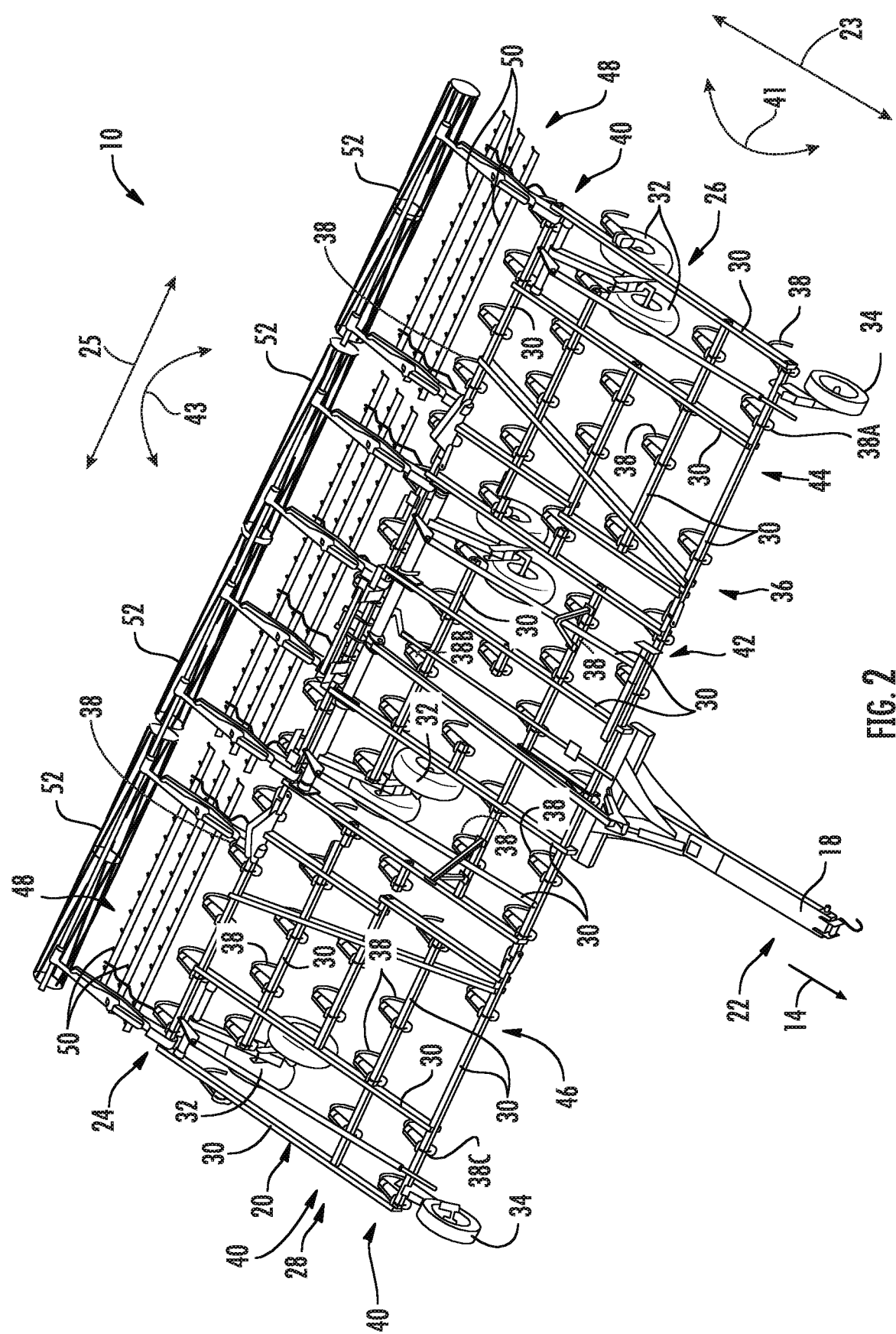
FIG. 2 illustrates a perspective view of the agricultural implement shown in FIG. 1, particularly illustrating various components of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field along a direction of travel 14 by the work vehicle 12. As shown, the work vehicle 12 may be configured as an agricultural tractor having a plurality of track assemblies 16 for use in traversing the field. It should be appreciated, however, that the work vehicle 12 may be configured as any suitable work vehicle, such as a wheeled vehicle. The implement 10 may be coupled to the work vehicle 12 via a pull hitch 18 or using any other suitable attachment means. As will be described below, the pull hitch 18 may be coupled to a corresponding adjustable hitch assembly (not shown) of the work vehicle 12.

In general, the implement 10 may include an implement frame 20. As shown in FIG. 2, the frame 20 may extend along a longitudinal direction 23 between a forward end 22 and an aft end 24. The frame 20 may also extend along a lateral direction 25 between a first side 26 and a second side 28. In this respect, the frame 20 generally includes a plurality of structural frame members 30, such as beams, bars, and/or the like, configured to support or couple to a plurality of components. Additionally, a plurality of wheel assemblies may be coupled to the frame 20, such as a set of centrally located wheels 32 and a set of front pivoting wheels 34, to facilitate towing the implement 10 in the direction of travel 14.

In several embodiments, the frame 20 may include one or more sections. As illustrated in FIG. 2, for example, the frame 20 may include a main section 42 positioned centrally between the first and second sides 26, 28 of the frame 20. The frame 20 may also include a first wing section 44 positioned proximate to the first side 26 of the frame 20. Similarly, the frame 20 may also include a second wing section 46 positioned proximate to the second side 28 of the frame 20. The first and second wing sections 44, 46 may be pivotally coupled to the main section 42 of the frame 20. In this respect, the first and second wing sections 44, 46 may be configured to fold up relative to the main section 42 to reduce the lateral width of the implement 10 to permit, for example, storage or transportation of the implement on a road. In should be appreciated that the frame 20 may include any suitable number of wing sections.

In general, as described above, it may be desirable that the implement frame 20 remains level or substantially level relative to the ground. As such, the levelness of the frame 20 may be generally defined by a pitch of the frame 20 (e.g., as indicated by arrow 41 in FIG. 2) and/or a roll (e.g., as indicated by arrow 43 in FIG. 2) of the frame 20. More specifically, the pitch 41 of the frame 20 may be a differential in the heights of the forward and aft ends 22, 24 of the frame 20 in the longitudinal direction 23 of the implement 10. That is, the frame 20 may be pitched when the one of the forward or aft ends 22, 24 of the frame 20 is closer to the ground than the other of forward or aft ends 22, 24 of the frame 20. Additionally, the roll 43 of the frame 20 may be a differential in the heights of the first and second sides 26, 28 of frame 20 in the lateral direction 25 of the implement 10. That is, the frame 20 may be rolled when the one of the first and second sides 26, 28 of the frame 20 is closer to the ground than the other of first and second sides 26, 28 of the frame 20.

In one embodiment, the frame 20 may be configured to support a cultivator 36, which may be configured to till or otherwise break the soil over which the implement 10 travels to create a seedbed. In this respect, the cultivator 36 may include a plurality of ground engaging tools 38, which are pulled through the soil as the implement 10 moves across the field in the direction of travel 14. As will be discussed in greater detail below, the ground engaging tools 38 may be configured to be pivotally mounted to the frame 20 to allow the ground engaging tools 38 to pivot out of the way of rocks or other impediments in the soil. As shown, the ground engaging tools 38 may be arranged into a plurality of ranks 40, which are spaced apart from one another along the longitudinal direction 23 between the forward end 22 and the aft end 24 of the frame 20. Furthermore, within each of the ranks 40, the ground engaging tools 38 may be spaced apart from one another along the lateral direction 25 between the first side 26 and the second side 28 of the frame 20.

For example, as shown in FIG. 2, in one embodiment, the implement 10 may include ground engaging tools 38A, 38B, 38C. More specifically, the ground engaging tools 38A, 38B, 38C may be spaced apart from one another along the lateral direction 25 of the implement 10 between the first side 26 and the second side 28 of the frame 20. In addition, one or more of the ground engaging tools 38, such tool 38B, may be spaced apart from the ground engaging tools 38A, 38C along the longitudinal direction 23 of the implement 10. Furthermore, the ground engaging tool 38B may be coupled to the main section 42 of the frame 20, while the ground engaging tool 38A may be coupled to the first wing section 44 of the frame 20 and the ground engaging tool 38C may be coupled to second wing 46 of the frame 20. However, it should be appreciated that, in alternative embodiments, the implement 10 may include any other suitable arrangement of ground engaging tools 38.

Moreover, as shown in FIGS. 1 and 2, the implement 10 may also include one or more harrows 48. As is generally understood, the harrows 48 may be configured to be pivotally coupled to the frame 20. The harrows 48 may include a plurality of ground engaging elements 50, such as tines or spikes, which are configured to level or otherwise flatten any windrows or ridges in the soil created by the cultivator 36. Specifically, the ground engaging elements 50 may be configured to be pulled through the soil as the implement 10 moves across the field in the direction of travel 14. It should be appreciated that the implement 10 may include any suitable number of harrows 48. In fact, some embodiments of the implement 10 may not include any harrows 48.

Moreover, in one embodiment, the implement 10 may optionally include one or more baskets or rotary firming wheels 52. As is generally understood, the baskets 52 may be configured to reduce the number of clods in the soil and/or firm the soil over which the implement 10 travels. As shown, each basket 52 may be configured to be pivotally coupled to one of the harrows 48. Alternately, the baskets 52 may be configured to be pivotally coupled to the frame 20 or any other suitable location of the implement 10. It should be appreciated that the implement 10 may include any suitable number of baskets 52. In fact, some embodiments of the implement 10 may not include any baskets 52.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration. For example, in one embodiment, the implement 10 may be configured as a disk harrow.

Figure 3:
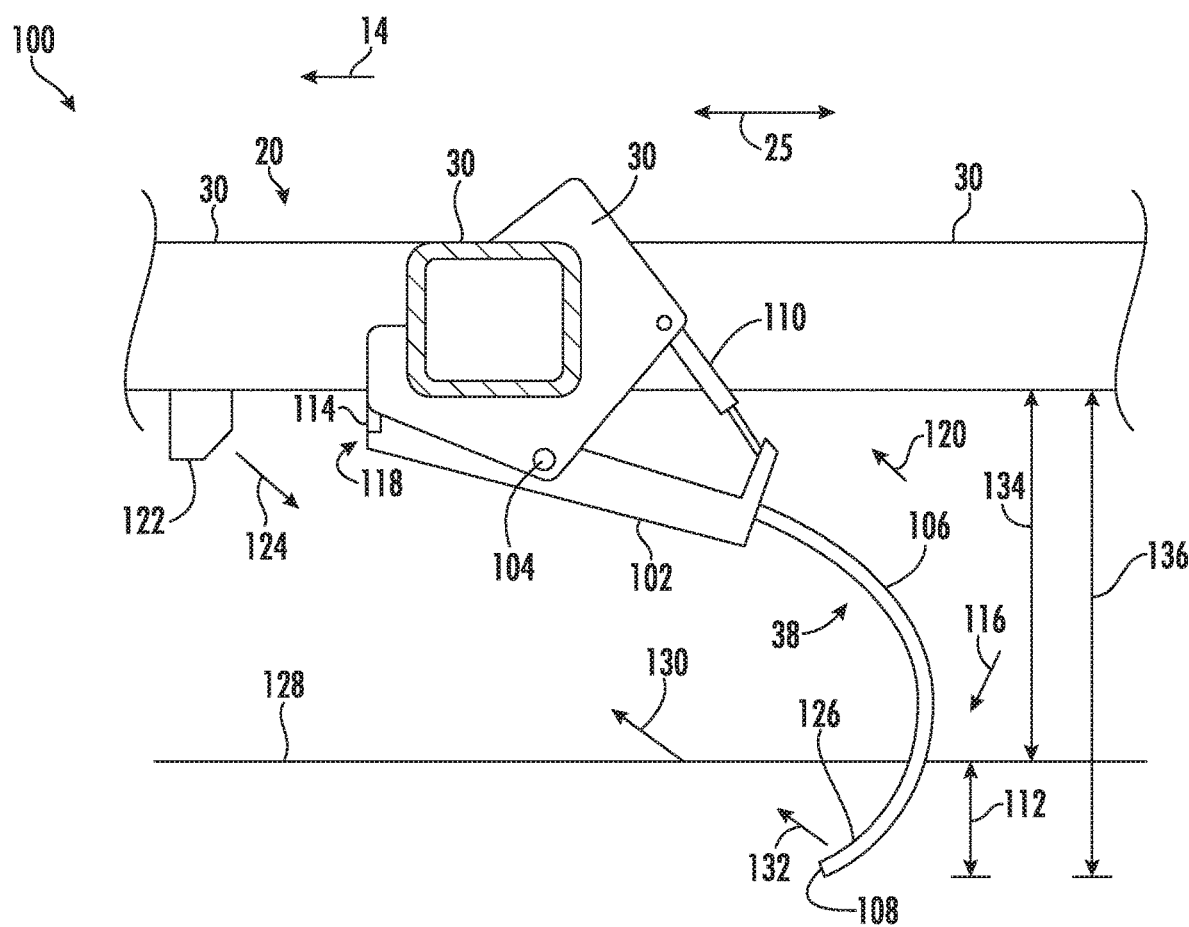
FIG. 3 illustrates a side view of one embodiment of a ground engaging tool assembly suitable for use within the agricultural implement shown in FIGS. 1 and 2 in accordance with aspects of the present subject matter, particularly illustrating an actuator configured to bias an associated ground engaging tool relative to a frame of the implement.

Referring now to FIG. 3, a perspective view of one embodiment of a ground engaging tool assembly 100 is illustrated in accordance with aspects of the present subject matter. In general, the assembly 100 will be described herein with reference to the implement 10 described above with reference to FIGS. 1 and 2. However, it should be appreciated by those of ordinary skill in the art that the disclosed assembly 100 may generally be utilized with implements having any other suitable implement configuration, such as a disk harrow.

As shown in FIG. 3, the ground engaging tool assembly 100 may include one of the ground engaging tools 38 described above with reference to FIGS. 1 and 2. More specifically, the ground engaging tool 38 may generally include a shank portion 102 configured to be pivotally coupled to the frame 20 (e.g., at pivot joint 104) and a ground-engaging portion 106 extending from the shank portion 102 along a curved or arcuate profile. The ground-engaging portion 106 may include a tip 108 that is configured to penetrate into or otherwise engage the ground as the implement 10 is being pulled through the field. In the illustrated embodiment, the ground engaging tool 38 is configured as a chisel. However, one of ordinary skill in the art would appreciate that the ground engaging tool 38 may be configured as a sweep, tine, or any other suitable ground engaging tool.

The assembly 100 may also include an actuator 110 coupled between the frame 20 and the ground engaging tool 38. In this respect, the actuator 110 may be configured to bias the ground engaging tool 38 to a predetermined tool position (e.g., a home or base position) relative to the frame 20. In general, the predetermined tool position may correspond to a tool position in which the ground engaging tool 38 penetrates the soil or ground to a desired depth. In several embodiments, the predetermined ground engaging tool position may be set by a mechanical stop 114. In operation, the actuator 110 may permit relative movement between the ground engaging tool 38 and the frame 20. For example, the actuator 110 may be configured to bias the ground engaging tool 38 to pivot relative to the frame 20 in a first pivot direction (e.g., as indicated by arrow 116 in FIG. 3) until an end 118 of the shank portion 102 of the ground engaging tool 38 contacts the stop 114. The actuator 110 may also allow the ground engaging tool 38 to pivot away from the predetermined tool position (e.g., to a shallower depth of penetration), such as in a second pivot direction (e.g., as indicated by arrow 120 in FIG. 3) opposite the first pivot direction 116, when encountering rocks or other impediments in the field.

It should be appreciated that the actuator 110 may be configured as any suitable type of actuator configured to bias the tool 38 relative to the frame 20. For example, in several embodiments, the actuator 110 may be configured as suitable fluid-driven actuators, such as suitable hydraulic or pneumatic cylinders. However, in alternative embodiments, the actuator 110 may be configured as any other suitable type of actuators, such as electric linear actuators. Additionally, in a further embodiment, the implement 10 may include a spring (not shown) configured to bias the tool 38 relative to the frame 20 in lieu of the actuator 110.

In accordance with aspects of the present subject matter, the assembly 100 may also include a sensor 122 configured to emit one or more sensor signals (e.g., as indicated by arrow 124 in FIG. 3) directed toward a portion 126 of the ground engaging tool 38 position below the soil surface 128. As such, a first portion of the sensor signal(s) 124 may be reflected off of the soil surface 128 as a first return signal(s) (e.g., as indicated by arrow 130 in FIG. 3). Furthermore a second portion of the sensor signal(s) 124 may penetrate the soil surface 128 and be reflected off of the portion 126 of the tool 38 as a second return signal(s) 132 (e.g., as indicated by arrow 132 in FIG. 3). Moreover, the sensor 122 may be configured to receive the first and second return signal(s) 130, 132. As will be described below, the signals 124, 130, 132 may then be analyzed to determine the penetration depth (e.g., as indicated by arrow 112 in FIG. 3) of the tool 38. As shown in FIG. 3, in several embodiments, the sensor 122 may be coupled to the frame 20 at a location forward of the ground engaging tool 38 relative to the direction of travel 14. For example, in the illustrated embodiment, the sensor 122 is directly mounted to the bottom side of one of the frame members 30. However, it should be appreciated that the sensor 122 may be mounted and/or positioned at any other suitable location on the implement 10 at which the sensor 122 may emit the sensor signal(s) 124 toward the portion 126 of the ground engaging tool 38.

Additionally, it should be appreciated that the sensor 122 may generally configured to emit any suitable type of sensor signal(s) 124. For example, in one embodiment, the sensor signal(s) 124 may correspond to one or more radio wave signals. In such embodiment, the sensor 122 may correspond to a radio detection and ranging (RADAR) sensor. However, in alternative embodiments, the sensor signal(s) 124 may correspond to one or more gamma ray signals and/or one or more x-ray signals.

As indicated above, FIG. 3 simply illustrates a single ground engaging tool 38 of the implement 10, with the sensor 122 being provided to monitor the penetration depth of such ground engaging tool 38. However, a person of ordinary skill in the art will appreciate that any or all of the remaining ground engaging tools 38 of the disclosed implement 10 may similarly be provided in operative association with an associated sensor 122. For example, as will be described below with reference to FIG. 4, a corresponding sensor 122 may be provided in operative association with each ground engaging tool 38A, 38B, 38C.

It should be appreciated that the configuration of the ground engaging tool assembly 100 described above and shown in FIG. 3 is provided only to place the present subject matter in an exemplary field of use. Thus, it should be appreciated that the present subject matter may be readily adaptable to any manner of ground engaging tool assembly configuration.

Figure 4:
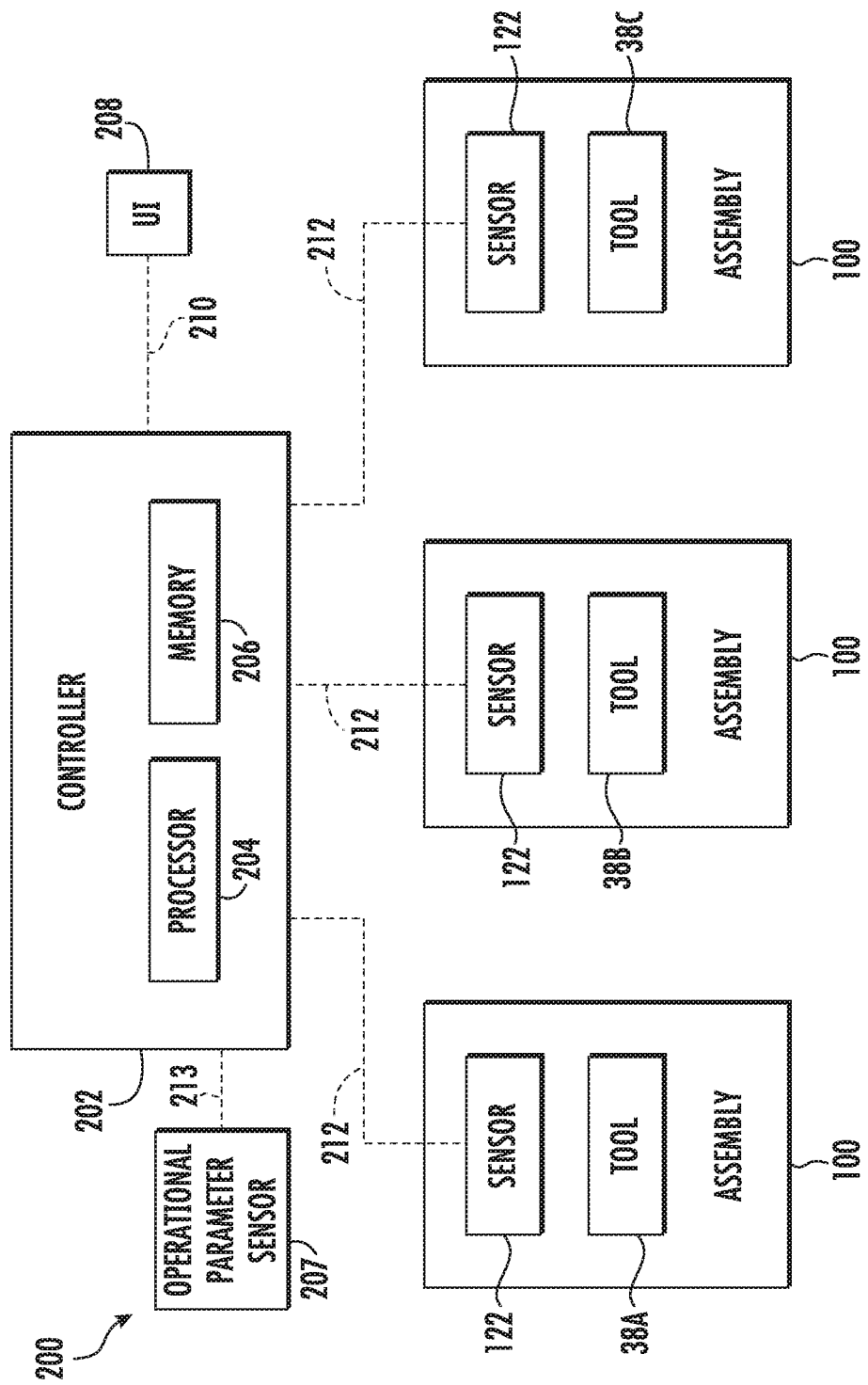
FIG. 4 illustrates a schematic view of one embodiment of a system for monitoring the frame levelness of an agricultural implement in accordance with aspects of the present subject matter.

Referring now to FIG. 4, a schematic view of one embodiment of a system 200 for monitoring the frame levelness of an agricultural implement is illustrated in accordance with aspects of the present subject matter. In general, the system 200 will be described herein with reference to the implement 10 and the ground engaging tool assemblies 100 described above with reference to FIGS. 1-3. However, it should be appreciated by those of ordinary skill in the art that the disclosed system 200 may generally be utilized with ground engaging tool assemblies having any other suitable tool assembly configuration and/or implements having any other suitable implement configuration.

As shown in FIG. 4, the system 200 may include a plurality of the ground engaging tool assemblies 100 coupled to the frame 20 of the implement 10. For example, in one embodiment, the system 200 may include ground engaging tool assemblies 100 incorporating the ground engaging tools 38A, 38B, 38C described above with associated sensors 122. However, it should be appreciated by those of ordinary skill in the art that the system 200 may include ground engaging tool assemblies 100 corresponding to any of the ground engaging tools 38 of the implement 10. Additionally, it should be appreciated that, although the system 200 is generally described herein with reference to a specific set of ground engaging tools 38A, 38B, 38C, the system 200 may generally include ground engaging tool assemblies 100 provided in association with any suitable ground engaging tool(s), including any of the other ground engaging tools shown and described above, such as the ground engaging elements 50 associated with the harrows 48, the rotary firming wheels 52, and/or any other ground engaging tools to be coupled to an implement frame 20.

Furthermore, the system 200 may also include a controller 202 configured to electronically control the operation of one or more components of the implement 10 or the work vehicle 12. In general, the controller 202 may comprise any suitable processor-based device known in the art, such as a computing device or any suitable combination of computing devices. Thus, in several embodiments, the controller 202 may include one or more processor(s) 204 and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 206 of the controller 202 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the method 300 described below with reference to FIG. 7. In addition, the controller 202 may also include various other suitable components, such as a communications circuit or module, one or more input/output channels, a data/control bus and/or the like.

It should be appreciated that the controller 202 may correspond to an existing controller of the implement 10 or the work vehicle 12 or the controller 202 may correspond to a separate processing device. For instance, in one embodiment, the controller 202 may form all or part of a separate plug-in module that may be installed within the implement 10 or the work vehicle 12 to allow for the disclosed system and method to be implemented without requiring additional software to be uploaded onto existing control devices of the implement 10 or the work vehicle 12.

Furthermore, in one embodiment, the system 200 may include an operational parameter sensor 207 provided in operative association with the implement 10. In this regard, the operational parameter sensor 207 may be configured to detect a first operational parameter of the implement 10. For example, the first operational parameter may be the location of the implement 10 within the field, the speed at which the implement 10 is moved across the field, the position of the actuator 110 (e.g., the position of a rod of the actuator 110 relative to a cylinder of the actuator 110), a fluid pressure within the actuator 110, or any other suitable parameter indicative of the operation of the implement 10. As such, the operational parameter sensor 207 may correspond to any suitable type of sensing device, such as a location sensor (e.g., a GNSS-based sensor), a Hall Effect sensor, a linear potentiometer, or a fluid pressure sensor.

Additionally, in one embodiment, the system 200 may also include a user interface 208. Specifically, the user interface 208 may be communicatively coupled to the controller 202 via a wired or wireless connection to allow feedback signals (e.g., as indicated by dashed line 210 in FIG. 4) to be transmitted from the controller 202 to the user interface 208. As such, the user interface 202 may be configured to provide feedback to the operator of the implement 10 based on the feedback signals 210. In addition, the user interface 102 may include one or more feedback devices (not shown), such as display screens, speakers, warning lights, and/or the like, which are configured to communicate such feedback. In addition, some embodiments of the user interface 208 may include one or more input devices (not shown), such as touchscreens, keypads, touchpads, knobs, buttons, sliders, switches, mice, microphones, and/or the like, which are configured to receive user inputs from the operator. In one embodiment, the user interface 208 may be positioned within an operator's cab (not shown) of the work vehicle 12. However, in alternative embodiments, the user interface 208 may have any suitable configuration and/or be positioned in any other suitable location.

In several embodiments, the system 200 may be configured to sense a first distance (e.g., as indicated by arrow 134 in FIG. 3) defined between a given reference point (e.g., the implement frame 20) and the soil surface 128 and a second distance (e.g., as indicated by arrow 136 in FIG. 3) defined between such reference point (e.g., the implement frame 20) and the tip 108 of the ground engaging tool 38. More specifically, as indicated above, the system 200 may include a plurality of sensors (e.g., the sensors 122 shown in FIG. 4), with each sensor being configured to emit sensor signal(s) 124 toward the portion 126 of the corresponding ground engaging tool 38 located beneath the soil surface 128. Thereafter, the sensor 102 may be configured to receive or detect the associated first and second return signals 130, 132 corresponding to the emitted sensor signal(s) 122 as reflected off of the soil surface 128 and the portion 126 of the corresponding tool 38, respectively. As such, the first return signal(s) 130 may be indicative of the first distance 134 defined between the reference point and the soil surface 128. For example, in one embodiment, a time duration or time-of-flight (TOF) defined between when the sensor signal(s) 124 is emitted by the sensor 122 and the first return signal(s) 130 is received by the sensor 122 may be indicative of the first distance 134. Similarly, the second return signal(s) 132 may be indicative of the second distance 136 between the reference point and the tip 108 of the corresponding tool 38. For example, in one embodiment, a time duration or time-of-flight (TOF) defined between when the sensor signal(s) 124 is emitted by the sensor 122 and the second return signal(s) 132 is received by the sensor 122 may be indicative of the second distance 136. However, it should be appreciated that, in alternative embodiments, the first and second distances 134, 136 may be determined based on any other suitable characteristic(s) of the sensor signal(s) 124 and/or the associated first and second return signals 130, 132.

Furthermore, in several embodiments, the controller 202 may be configured to monitor the penetration depths of the ground engaging tools 38A, 38B, 38C based on data received from the various sensors 122. Specifically, the controller 202 may be communicatively coupled to the sensors 122 provided in operative association with the ground engaging tools 38A, 38B, 38C via a wired or wireless connection to allow data (e.g., indicated by dashed lines 212 in FIG. 4) to be transmitted from the sensors 122 to the controller 202. In general, the sensor data 212 received from each sensor 122 may be indicative of one or more characteristics of the sensor signal(s) 124 emitted by that sensor 122 and the first and second return signals 130, 132 received by that sensor 122. As such, the controller 202 may be configured to determine or estimate the first distance 134 defined between the reference point and the soil surface 128 adjacent to at least two of the ground engaging tools 38A, 38B, 38C based on the sensor signal(s) 124 and the first return signal(s) 130. Furthermore, the controller 202 may be configured to determine or estimate the second distance 136 between the reference point and the corresponding tip 108 of at least two of the ground engaging tools 38A, 38B, 38C based on the sensor signal(s) 124 and the second return signal(s) 132. For instance, the controller 202 may include a look-up table or suitable mathematical formula stored within its memory 206 that correlates the sensor measurements (e.g., TOF data) to the first and second distances 134, 136. Thereafter, the controller 202 may then be configured to compare the current first and second distances 134, 136 associated with two or more of the ground engaging tools 38A, 38B, 38C to determine the corresponding penetration depths 112 to of ground engaging tools 38A, 38B, 38C.

Moreover, the controller 202 may be configured to monitor the frame levelness associated with the implement frame 20 based on the penetration depths 112 of at least two of the ground engaging tools 38A, 38B, 38C. Specifically, the controller 202 may be configured to compare the determined penetration depths 112 of at least two of the ground engaging tools 38A, 38B, 38C to monitor a penetration depth differential defined therebetween. Thereafter, the controller 202 may be configured to compare the monitored penetration depth differential to a maximum penetration depth differential threshold set for the implement 10. In the event that the monitored penetration depth differential exceeds the maximum penetration depth differential threshold, the controller 202 may be configured to determine that the implement frame 20 is not sufficiently level, such as when the frame 20 is pitched and/or rolled.

As indicated above, the ground engaging tools 38A, 38B, 38C may be laterally spaced apart from each other across the implement 10. In such instances, a differential in the monitored penetration depths 112 between two or more of the ground engaging tools 38A, 38B, 38C may be indicative of roll or rolling of the implement frame 20 in the lateral direction 25 of the implement 10 (e.g., the frame 20 has rolled in one direction or the other laterally such that the first and second sides 26, 28 of the frame 20 are at different heights relative to the ground). For example, in certain instances, if the penetration depth differential between two or more of the laterally spaced apart ground engaging tools 38A, 38B, 38C is too great, the frame 20 of the implement 10 may be rolled or angled relative to the ground such that the penetration depths 112 of the laterally spaced ground-engaging tools 38A, 38B, 38C varies undesirably. Accordingly, in several embodiments, the controller 202 may be configured to compare the penetration depth differential determined to exist between two or more of the laterally spaced ground engaging tools 38A, 38B, 38C to a predetermined maximum penetration depth differential threshold set for the implement 10. In such embodiments, the maximum penetration depth differential threshold may correspond to a penetration depth differential between two or more laterally spaced ground engaging tools 38A, 38B, 38C that, when exceeded, is indicative of an undesirable amount of roll or rolling of the frame 20, thereby indicating that the levelness or orientation of the implement frame 20 may need to be adjusted or corrected across the lateral direction 25 of the implement 10.

Additionally, as indicated above, the ground engaging tools 38A, 38B, 38C may be longitudinally spaced apart from each other across the implement 10. In such instances, a differential in the monitored penetration depths 112 between two or more of the ground engaging tools 38A, 38B, 38C may be indicative of pitch or pitching of the implement frame 20 in the longitudinal direction 23 of the implement 10 (e.g., the frame 20 has pitched in one direction or the other longitudinally such that the forward and aft ends 22, 24 of the frame 20 are at different heights relative to the ground). For example, in certain instances, if the penetration depth differential between two or more of the longitudinally spaced apart ground engaging tools 38A, 38B, 38C is too great, the frame 20 of the implement 10 may be pitched or angled relative to the ground such that the penetration depths 112 of the longitudinally spaced ground-engaging tools 38A, 38B, 38C varies undesirably. Accordingly, in several embodiments, the controller 202 may be configured to compare the penetration depth differential determined to exist between two or more of the longitudinally spaced ground engaging tools 38A, 38B, 38C to a predetermined maximum penetration depth differential threshold set for the implement 10. In such embodiments, the maximum penetration depth differential threshold may correspond to a penetration depth differential between two or more longitudinally spaced ground engaging tools 38A, 38B, 38C that, when exceeded, is indicative of an undesirable amount of pitch or pitching of the frame 20, thereby indicating that the levelness or orientation of the implement frame 20 may need to be adjusted or corrected across the longitudinal direction 23 of the implement 10.

Furthermore, in one embodiment, the controller 202 may be configured to monitor a second operational parameter of the implement 10 based on the first operational parameter and/or at least one of the monitored penetration depths of the ground engaging tools 38A, 38B, 38C. In general, the second operational parameter may be any operational parameter of the implement 10 that is different than the first operational parameter. For example, in one embodiment, when the first operational parameter corresponds to the fluid pressure within the actuator 110, the second operational parameter may correspond to the density of the soil. As shown in FIG. 4, the controller 202 may be communicatively coupled to the operational parameter sensor 207 via a wired or wireless connection to allow data (e.g., indicated by dashed lines 213 in FIG. 4) to be transmitted from the operational parameter sensor 207 to the controller 202. As such, the controller 202 may be configured to determine or estimate the second operational parameter based on the data 212 received from the sensor(s) 122 and/or the data 213 received from the operational parameter sensor 207. For instance, the controller 202 may include a look-up table or suitable mathematical formula stored within its memory 206 that correlates the sensor data 212, 213 to the second operational parameter.

In accordance with aspects of the present subject matter, when the parameter differential determined by the controller 202 exceeds the predetermined parameter differential threshold set for the implement 10, the controller 202 may be configured initiate a control action associated with adjusting the pitch and/or the roll of the frame 20, thereby correcting the levelness of the implement frame 20. For instance, in one embodiment, the controller 202 may be configured to transmit a notification to the operator of the implement 10 (e.g., by causing a visual or audible notification or indicator to be presented to the operator within the work vehicle 12 via the user interface 208) that provides an indication that the penetration depth differential between at least two of the ground engaging tools 38A, 38B, 38C exceeds the penetration depth differential threshold, such as by providing a notification that the frame 20 is not level in the longitudinal direction 23 and/or the lateral direction 25 due to pitching and/or rolling of the frame 20. In such instances, the operator may then choose to initiate any suitable corrective action he/she believes is necessary, such as by manually adjusting the position of the wheels 32 relative to the frame 20 or by manually controlling the operation of one or more components of the implement 10 in a manner designed to reorient the frame 20 relative to the ground. Additionally, in one embodiment, the controller 202 may be configured to generate a field map that visually identifies the levelness of the field across each portion of the field traversed by the implement 10 based on the penetration depths differential between at least two of the ground engaging tools 38A, 38B, 38C. Alternatively, as will be described below with reference to FIGS. 8 and 9, the controller 202 may be configured to automatically control the operation of one or more components of the implement 10 in a manner designed to adjust the pitch and/or the roll of the frame 20.

Figure 5:
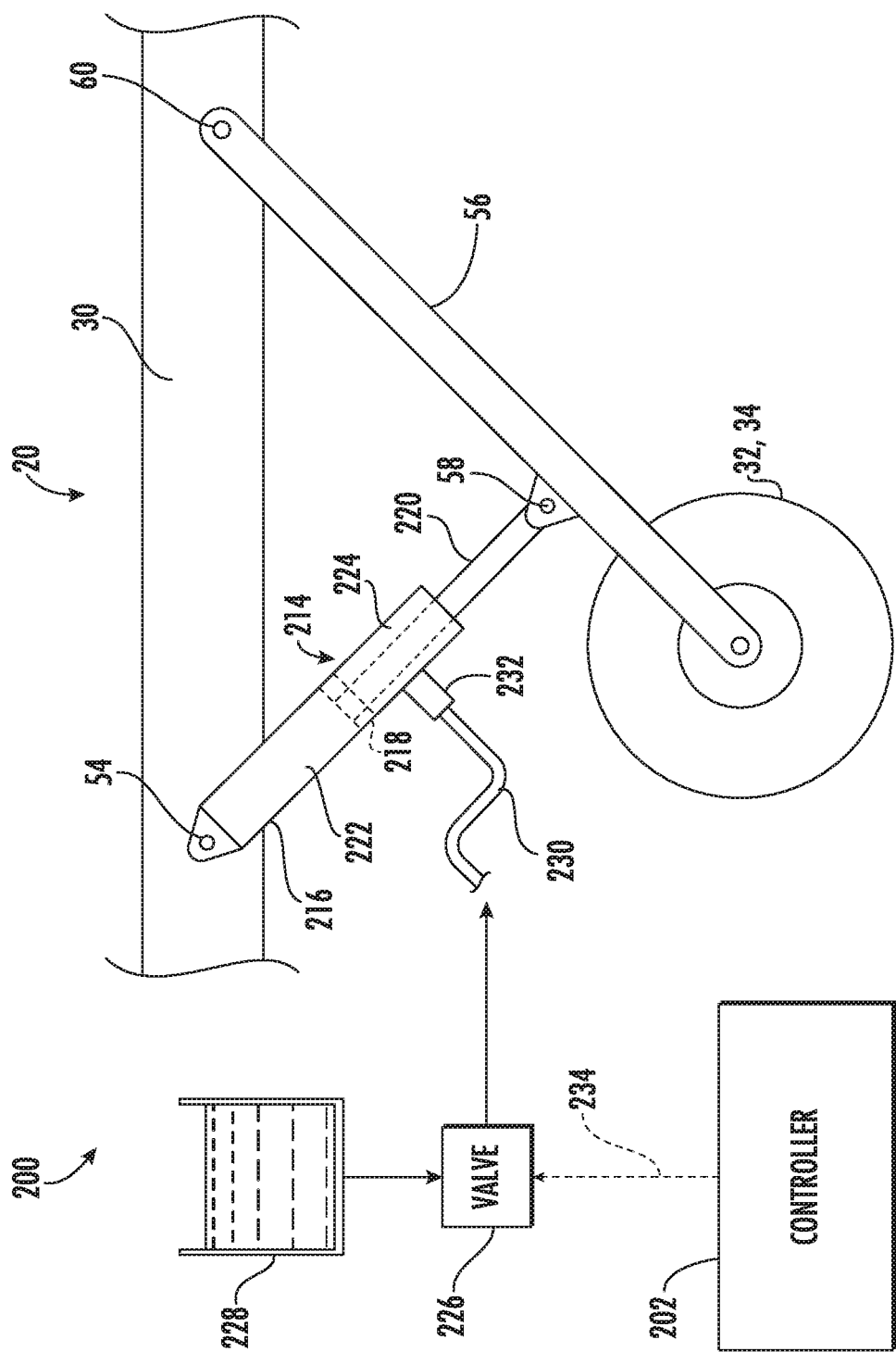
FIG. 5 illustrates a side view of another embodiment of a system for monitoring the frame levelness of an agricultural implement in accordance with aspects of the present subject matter, particularly illustrating the system including an actuator for adjusting a position of a wheel relative to the implement's frame.

FIG. 5 illustrates a side view of an implementation of the system 200 described above with reference to FIG. 4 in accordance with aspects of the present subject matter. Specifically, the embodiment shown in FIG. 5 illustrates an example configuration that may be used for adjusting the relative positioning of one or more components of the implement 10 so as to allow the pitch and/or the roll of the frame 20 to be adjusted when it is determined that an undesirable penetration depth differential exists between two or more of the ground engaging tools 38A, 38B, 38C of the implement 10. For example, FIG. 5 illustrates a side view of an actuator 214 configured for adjusting a position of one of the wheels 32, 34 of the implement 10 relative to the frame 20 of the implement 10. It should be appreciated that, in the illustrated embodiment of FIG. 5, the actuator 214 corresponds to a hydraulic cylinder. However, it should be appreciated that the actuator 214 may also correspond to any other suitable actuator, such as a pneumatic actuator, linear actuator, or a solenoid.

In several embodiments, the wheels 32, 34 may be configured to be pivotable or otherwise moveable relative to the frame 20 of the implement 10 so as to permit one or more associated actuators 214 to adjust the position of the wheels 32, 34 relative to the frame 20. In such embodiments, when the penetration depth differential between two laterally spaced apart ground engaging tools 38A, 38B, 38C exceeds the associated penetration depth differential, the position of the wheels 32, 34 relative to the frame 20 may be adjusted so as to adjust the orientation the frame 20 in the lateral direction 25.

As shown in FIG. 5, in one embodiment, one end of the actuator 214 may be pivotably coupled to one of the frame members 30 of the frame 20 at a pivot joint 54. Similarly, an opposed end of the actuator 214 may also be coupled to a pivot arm 56 of the implement 10 at a pivot joint 58. As shown, the pivot arm 56 may, in turn, pivotably couple the wheel 32, 34 to the corresponding frame member 30 of the frame 20 at a pivot joint 60. As such, the pivot joints 54, 58, 60 may allow relative pivotable movement between the frame member 30, the pivot arm 56, and the actuator 214, thereby allowing the position of the associated wheel 32, 34 relative to the frame 20 to be adjusted. However, a person of ordinary skill in the art would appreciate that the wheels 32, 34 may be adjustably coupled to the frame 20 in any suitable manner that permits the actuator 214 to move the wheels 32, 34 relative to the frame 20. Furthermore, the actuator 214 may be configured to move any of the wheels 32, 34 on the implement 10 relative to the frame 20.

As indicated above, the actuator 214 may correspond to a suitable hydraulic actuator. Thus, in several embodiments, the actuator 214 may include both a cylinder 216 configured to house a piston 218 and a rod 220 coupled to the piston 218 that extends outwardly from the cylinder 216. Additionally, the actuator 214 may include a piston-side chamber 222 and a rod-side chamber 224 defined within the cylinder 216. As is generally understood, by regulating the pressure of the fluid supplied to one or both of the cylinder chambers 222, 224, the actuation of the rod 220 may be controlled. As shown in FIG. 5, in the illustrated embodiment, the end of the rod 220 is coupled to the arm 56 at the pivot joint 58, while the cylinder 216 is coupled to the frame member 30 at the opposed pivot joint 54. However, in an alternative embodiment, the end of the rod 220 may be coupled to the frame member 30 at pivot joint 54 while the cylinder 216 may be coupled to the arm 56 at the pivot joint 58.

In several embodiments, the system 200 may also include a suitable pressure regulating valve 226 (PRV) (e.g., a solenoid-activated valve or a manually operated valve) configured to regulate a supply of fluid (e.g., hydraulic fluid or air from a suitable fluid source or tank 228) being supplied to the actuator 214. As shown in FIG. 5, in one embodiment, the PRV 226 may be in fluid communication with the rod-side chamber 224 of the actuator 214. In this respect, the system 200 may include a fluid conduit 230, such as the illustrated hose, that fluidly couples the PRV 226 to a fitting 232 on the cylinder 216. As such, the PRV 226 may regulate the supply fluid to the rod-side chamber 224. It should be appreciated that, in alternate embodiments, the PRV 226 may be in fluid communication with the piston-side chamber 222 to regulate the supply fluid thereto. Alternatively, the system 200 may include a pair of PRVs 226, with each PRV 226 being in fluid communication with one of the chambers 222, 224 of the actuator 214.

Utilizing the system configuration shown in FIG. 5, the controller 202 may be configured to automatically control the operation of the actuator 214 so as to adjust the position of the wheels 32, 34 relative to the frame 20. Specifically, as indicated above, the controller 202 may be configured to detect when the penetration depth differential between two or more of the ground engaging tools 38A, 38B, 38C exceeds an associated predetermined penetration depth differential threshold. In such instance, the controller 202 may be configured to electronically control operation of the PRV 226 to adjust the fluid pressure supplied within the actuator 214. For instance, the controller 202 may be configured to control the operation of the PRV 226 (e.g., via controls signals indicated by dashed line 234 in FIG. 5) such that the fluid pressure supplied to the rod-side chamber 224 of the actuator 214 is increased or decreased when it is detected that the parameter differential exceeds the associated parameter differential threshold. Increasing the fluid pressure within the rod-side chamber 224 may cause the rod 220 to retract into the cylinder 216, thereby moving the wheel 32, 34 closer to the frame 20. Conversely, decreasing the fluid pressure within the rod-side chamber 224 may cause the rod 220 to extend further from the cylinder 216, thereby moving the wheel 32, 34 farther away to the frame 20. Pivoting the wheel 32,34 upward relative to the frame 20 (e.g., if a portion of the frame 20 proximate to that wheel 32, 34 is farther from the ground than the portion of the frame 20 proximate to another of wheels 32, 34) or pivoting the wheels 32, 34 downward relative to the frame 20 (e.g., if a portion of the frame 20 proximate to that wheel 32, 34 is closer from the ground than the portion of the frame 20 proximate to another wheels 32, 34) may, for example, allow for a corresponding reduction in the roll of the frame 20.

Figure 6:
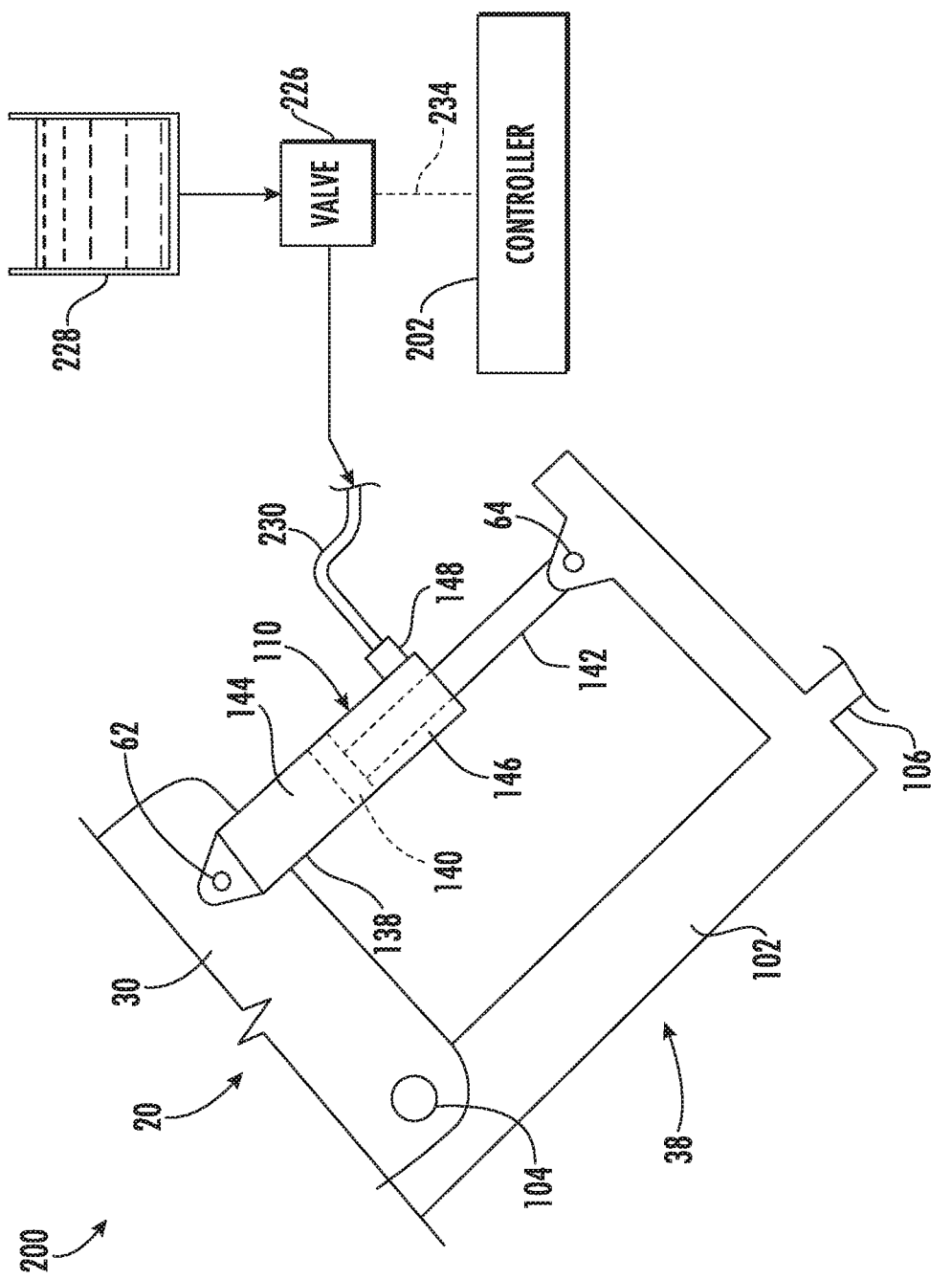
FIG. 6 illustrates a side view of a further embodiment of a system for monitoring the frame levelness of an agricultural implement in accordance with aspects of the present subject matter, particularly illustrating the system including an actuator for adjusting a position of a ground engaging tool relative to the implement's frame.

Referring now to FIG. 6, a side view of another implementation of the system 200 described above with reference to FIG. 4 is illustrated in accordance with aspects of the present subject matter. Specifically, the embodiment shown in FIG. 6 illustrates an example configuration that may be used for adjusting the penetration depths of one or more of the ground engaging tools 38 so as to maintain a uniform penetration depth across two or more of the tools 38 when it is determined that an undesirable penetration depth differential exists between such tools 38.

As indicated above, in one embodiment, an actuator 110 may be coupled between the frame 20 and the ground engaging tool 38, with the actuator 110 being configured to permit relative movement between the ground engaging tool 38 and the frame 20. Specifically, as shown, one end of the actuator 110 may be pivotably coupled to one of the frame members 30 of the frame 20 at a pivot joint 62. Similarly, an opposed end of the actuator 110 may also be coupled to the ground engaging tool 38 at a pivot joint 64. As indicated above, the tool 38 may be pivotably coupled to a frame member 30 of the frame 20 at the pivot joint 104. In this regard, the pivot joints 62, 64, 102 may allow relative pivotable movement between the frame member 30, the tool 38, and the actuator 214, thereby allowing the position of the tool 38 relative to the frame 20 to be adjusted. However, a person of ordinary skill in the art would appreciate that the tool 38 may be adjustably coupled to the frame 20 in any suitable manner that permits the actuator 110 to move the tool 38 relative to the frame 20. Furthermore, the actuator 110 may be configured to move any of the tools 38 on the implement 10 relative to the frame 20.

Utilizing the system configuration shown in FIG. 6, the controller 202 may be configured to automatically control the operation of the actuator 110 so as to adjust the position of the ground engaging tool 38 relative to the frame 20. Specifically, as indicated above, the controller 202 may be configured to detect when the penetration depth differential between two or more of the ground engaging tools 38A, 38B, 38C exceeds an associated predetermined penetration depth differential threshold. In such instance, the controller 202 may be configured to electronically control operation of the PRV 226 to adjust the fluid pressure supplied within the actuator 110. For instance, the controller 202 may be configured to control the operation of the PRV 226 (e.g., via controls signals indicated by dashed line 234 in FIG. 5) such that the fluid pressure supplied to the rod-side chamber 146 of the actuator 110 is increased or decreased when it is detected that the parameter differential exceeds the associated parameter differential threshold. Increasing the fluid pressure within the rod-side chamber 146 may cause the rod 142 to retract into the cylinder 138, thereby moving the ground engaging tool relative to the frame such that its penetration depth 112 is decreased. Conversely, decreasing the fluid pressure within the rod-side chamber 146 may cause the rod 142 to extend further from the cylinder 138, thereby moving the ground engaging tool 38 relative to the frame 20 such that its penetration depth 112 is increased. Adjusting the penetration depth 112 of the ground engaging tools 38 may permit a uniform penetration depth for two or more of the ground engaging tools 38 mounted on the implement 10 despite the implement frame 20 being pitched and/or rolled. It should be appreciated that, in one embodiment, the magnitude of the adjustment of the penetration depth 112 of the ground engaging tool 38 may be based on the magnitude of the determined penetration depth differential.

Figure 7:
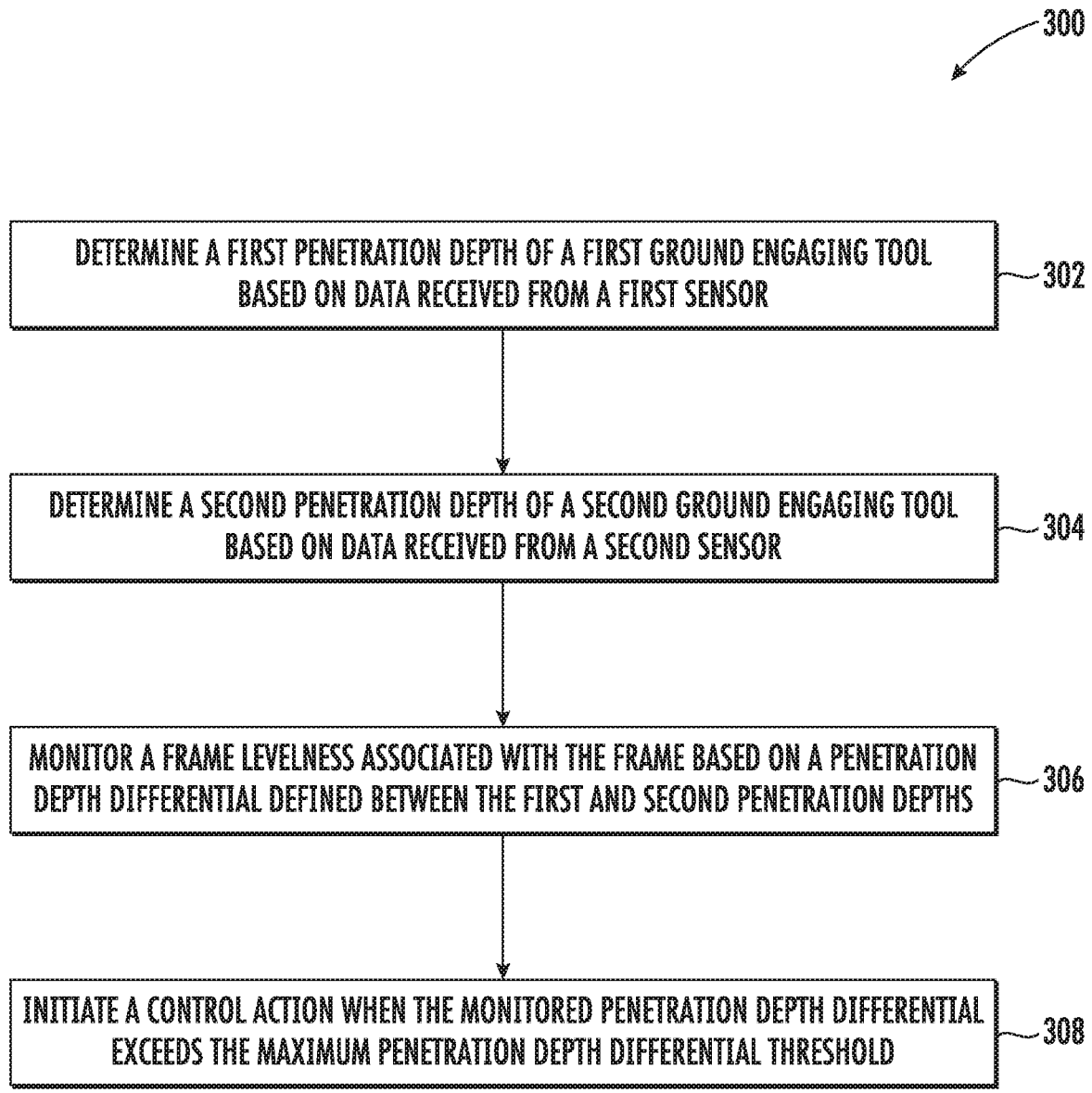
FIG. 7 illustrates a flow diagram of one embodiment of a method for monitoring the frame levelness of an agricultural implement in accordance with aspects of the present subject matter.

Referring now to FIG. 7, a flow diagram of one embodiment of a method 300 for monitoring the frame levelness of an agricultural implement is illustrated in accordance with aspects of the present subject matter. In general, the method 300 will be described herein with reference to the implement 10, the ground engaging tool assemblies 100, and the system 200 described above with reference to FIGS. 1-6. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (302), the method 300 may include determining, with a computing device, a first penetration depth of a first ground engaging tool based on data received from a first sensor. For instance, as described above, the controller 202 may be communicatively coupled to one of sensors 122 configured to capture data 212 indicative of the penetration depth 112 of one of the ground engaging tools 38A, 38B, 38C. As such, data 212 transmitted from the sensors 122 may be received by the controller 108 and subsequently analyzed and/or processed to determine the penetration depth 112 of such tool 38A, 38B, 38C.

Additionally, at (304), the method 300 may include determining, with the computing device, a second penetration depth of a second ground engaging tool based on data received from a second sensor. For instance, as described above, the controller 202 may be communicatively coupled to one or more other sensors 122 configured to capture data 212 indicative of the penetration depth 112 of another of the ground engaging tools 38A, 38B, 38C. As such, data 212 transmitted from the sensors 122 may be received by the controller 108 and subsequently analyzed and/or processed to determine the penetration depth 112 of such tool 38A, 38B, 38C.

Moreover, as shown in FIG. 7, at (306), the method 300 may include monitoring, with the computing device, a frame levelness associated with the frame based on a penetration depth differential defined between the first and second penetration depths. For instance, the controller 202 may be configured to compare the current penetration depth values associated with at least two of the ground engaging tools 38A, 38B, 38C to determine the penetration depth differential existing therebetween.

Furthermore, at (308), the method 300 may include initiating, with the computing device, a control action when the monitored penetration depth differential exceeds the maximum penetration depth differential threshold. As indicated above, the controller 202 may be configured to monitor the penetration depth differential relative to an associated maximum penetration depth differential threshold. In the event that the penetration depth differential exceeds the penetration depth differential threshold, the controller 202 may then implement a control action to adjust the associated roll and/or pitch of the frame 20 as determined by the penetration depth differential currently existing between the corresponding ground engaging tools 38A, 38B, 38C. As described above, such control actions may, in several embodiments, include controlling one or more components of the implement 10. For instance, the controller 202 may, in one embodiment, be configured to control one or more operator-interface components located within the work vehicle's cab (e.g., the user interface 208) to allow a visual and/or audible notification to be presented to the operator. In addition, or as an alternative thereto, the controller 202 may be configured to actively regulate the pressure of the fluid supplied within an associated actuator 214 (e.g., by electronically controlling the associated PRV 226) to adjust the relative position (s) between various components of the implement 10 and/or the relative position(s) between the implement 10 and the work vehicle 12. For example, in one embodiment, the actuator 214 may adjust the position of one or more of the wheels 32, 34 relative to the implement frame 20.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for monitoring the frame levelness of an agricultural implement, the system comprising:
   a frame extending in a longitudinal direction between a forward end and an aft end and in a lateral direction between a first side and a second side;
   first and second ground engaging tools coupled to the frame, the first and second ground engaging tools being spaced apart from each other in at least one of the longitudinal direction or the lateral direction;
   a first sensor configured to capture data indicative of a first position differential defined between a soil surface and a portion of the first ground engaging tool positioned below the soil surface, the captured data being associated with the receipt of sensor signals reflected off of the portion of the first ground engaging tool positioned below the soil surface;
   a second sensor configured to capture data indicative of a second position differential defined between the soil surface and a portion of the second ground engaging tool positioned below the soil surface, the captured data being associated with the receipt of sensor signals reflected off of the portion of the second ground engaging tool positioned below the soil surface; and
   a controller communicatively coupled to the first and second sensors, the controller being configured to:
      determine a first penetration depth of the first ground engaging tool based on the captured data received from the first sensor;
      determine a second penetration depth of the second ground engaging tool based on the captured data received from the second sensor; and
      monitor a frame levelness associated with the frame based on a penetration depth differential defined between the first and second penetration depths.

2. The system of claim 1, wherein the sensor signals comprise at least one of radio wave signals, gamma ray signals, or x-ray signals.

3. The system of claim 1, wherein the monitored penetration depth differential is indicative of at least one of pitch or roll of the frame.

4. The system of claim 3, wherein the first and second ground engaging tools are spaced apart from each other in the lateral direction, the monitored penetration depth differential being indicative of roll of the frame.

5. The system of claim 3, wherein the first and second ground engaging tools are spaced apart from each other in the longitudinal direction, the monitored penetration depth differential being indicative of pitch of the frame.

6. The system of claim 1, wherein the controller is further configured initiate a control action associated with adjusting the frame levelness based on a magnitude of the monitored penetration depth differential.

7. The system of claim 6, wherein the controller is configured to compare the monitored penetration depth differential to a maximum penetration depth differential threshold set for the implement, the controller being configured to initiate the control action when the monitored penetration depth differential exceeds the maximum penetration depth differential threshold.

8. The system of claim 6, further comprising:
   a plurality of wheels coupled to the frame, the control action being associated with adjusting a position of one or more of the wheels relative to the frame.

9. The system of claim 1, further comprising:
   a third sensor configured to capture data indicative of a first operational parameter of the implement, the controller further being configured to determine a second operational parameter based on data received from at least two of the first sensor, the second sensor, or the third sensor.

10. The system of claim 1, wherein the first and second ground engaging tools are pivotally coupled to the frame, further comprising:
    a first actuator coupled between the frame and the first ground engaging tool and a second actuator coupled between the frame and the second ground engaging tool, the controller being further configured initiate a control action associated with at least one of adjusting a position of the first ground engaging tool relative to the frame or adjusting a position of the second ground engaging tool relative to the frame based on a magnitude of the monitored penetration depth differential.

11. A system for monitoring the penetration depths of tools associated with an agricultural implement, the system comprising:
    a frame;
    a ground engaging tool coupled to the frame;
    a sensor configured to capture data indicative of a position differential defined between a soil surface of the ground and a portion of the ground engaging tool positioned below the soil surface, the captured data being associated with the receipt of sensor signals reflected off of both the soil surface and the portion of the second ground engaging tool positioned below the soil surface; and
    a controller communicatively coupled to the sensor, the controller being configured to:
       determine a first distance between the frame and the soil surface based on the captured data received from the sensor;
       determine a second distance between the frame and a tip of the ground engaging tool positioned below the soil surface based on the captured data received from the sensor; and
       determine a penetration depth of the ground engaging tool based on a differential defined between the first and second distances.

12. The system of claim 11, wherein the sensor signals comprise at least one of radio wave signals, gamma ray signals, or x-ray signals.

13. A method for monitoring the frame levelness of an agricultural implement, the implement including a frame extending in a longitudinal between a forward end and an aft end and in a lateral direction between a first side and a second side, the implement further including first and second ground engaging tools coupled to the frame, the first and second ground engaging tools being spaced apart from each other in at least one of the longitudinal direction or the lateral direction, the method comprising:
   determining, with a computing device, a first penetration depth of the first ground engaging tool based on data received from a first sensor, the first sensor being configured to capture data indicative of a first position differential defined between a soil surface and a portion of the first ground engaging tool positioned below the soil surface, the captured data being associated with the receipt of sensor signals reflected off of the portion of the first ground engaging tool positioned below the soil surface;
   determining, with the computing device, a second penetration depth of the second ground engaging tool based on data received from a second sensor, the second sensor being configured to capture data indicative of a second position differential defined between the soil surface and a portion of the second ground engaging tool positioned below the soil surface, the captured data being associated with the receipt of sensor signals reflected off of the portion of the second ground engaging tool positioned below the soil surface; and
   monitoring, with the computing device, a frame levelness associated with the frame based on a penetration depth differential defined between the first and second penetration depths; and
   initiating, with the computing device, a control action associated with adjusting the frame levelness based on a magnitude of the monitored parameter differential.

14. The method of claim 13, wherein the sensor signals comprise at least one of radio wave signals, gamma ray signals, or x-ray signals.

15. The method of claim 13, wherein the monitored penetration depth differential is indicative of at least one of pitch or roll of the frame.

16. The method of claim 15, wherein the first and second ground engaging tools are spaced apart from each other in the lateral direction, the monitored penetration depth differential being indicative of roll of the frame.

17. The method of claim 15, wherein the first and second ground engaging tools are spaced apart from each other in the longitudinal direction, the monitored penetration depth differential being indicative of pitch of the frame.

18. The method of claim 13, further comprising:
   comparing, with the computing device, the monitored penetration depth differential to a maximum penetration depth differential threshold set for the implement; and
   initiating, with the computing device, the control action when the monitored penetration depth differential exceeds the maximum penetration depth differential threshold.

19. The method of claim 13, wherein the implement further includes a plurality of wheels, the control action being associated with adjusting a position of one or more of the wheels relative to the frame.

20. The method of claim 13, further comprising:
   determining, with the computing device, a first operational parameter of the implement based on data received from a third sensor; and
   determining, with the computing device, a second operational parameter based on at least two of the first penetration depth, the second penetration depth, or the first operational parameter.

* * * * *